Dec. 1, 1925  
W. I. McLAUGHLIN  
1,563,641  
FISHING TOOL FOR UNDERREAMER BITS  
Filed Feb. 7, 1923

INVENTOR  
WILLIAM I. McLAUGHLIN  
BY Harry C. Schroede  
ATTORNEY

Patented Dec. 1, 1925.

1,563,641

UNITED STATES PATENT OFFICE.

WILLIAM IRA McLAUGHLIN, OF OAKLAND, CALIFORNIA, ASSIGNOR TO STANDARD OIL COMPANY, OF SAN FRANCISCO, CALIFORNIA, A CORPORATION OF CALIFORNIA.

FISHING TOOL FOR UNDERREAMER BITS.

Application filed February 7, 1923. Serial No. 617,525.

*To all whom it may concern:*

Be it known that I, WILLIAM IRA MCLAUGHLIN, a citizen of the United States, residing at Oakland, in the county of Alameda and State of California, have invented certain new and useful Improvements in Fishing Tools for Underreamer Bits, of which the following is a specification.

My invention is an improved oil well fishing tool for under-reamer bits and other well tools.

Under-reamer cutters and other small tools are occasionally dropped into the oil well and it is very difficult to recover them. Wells have been known to be abandoned because tools had been lost therein and it was impossible to recover them.

The object of my invention is to provide a fishing tool which is secured to the end of the drilling rig and may be lowered into the well to recover the lost tools.

Another object of my invention is to provide a fishing tool which is simple in construction and efficient in operation.

In the drawing in which my invention is illustrated, I have shown the preferred form but it may be embodied in other forms, and in this specification and appended claims I wish to cover my invention in whatever form it may be embodied.

Referring to the drawing.

Figure 1:
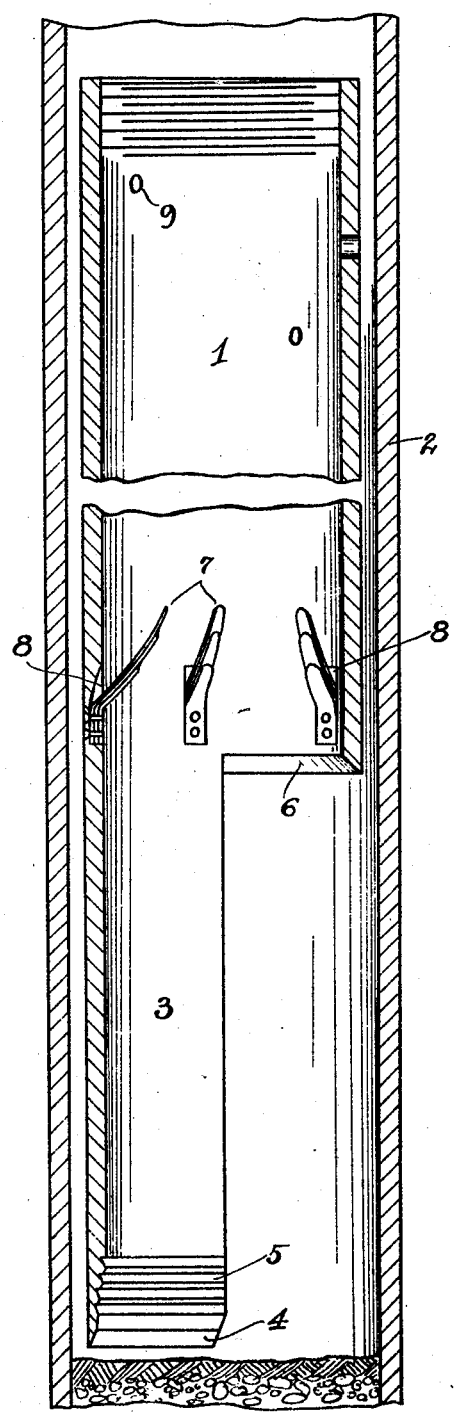
Figure 1 is a longitudinal sectional view of my tool.
Figure 2:
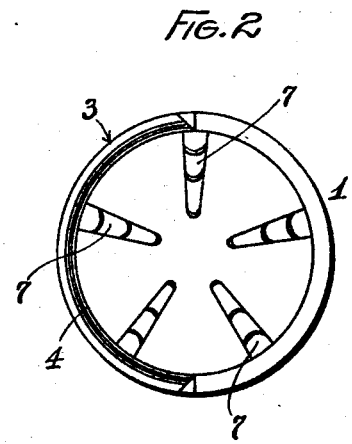
Figure 2 is a bottom plan view of my tool.

Referring more particularly to the drawing the numeral 1 indicates the cylindrical body portion of my tool, which has the proper diameter to enter the well casing 2. An arm 3 depends from the bottom of the body 1, said arm is semi-circular in cross section and has a cutting edge 4 formed on the bottom thereof. A plurality of corrugations 5 are formed on the inner surface of the arm 3 above the edge 4. A semi-circular cutting edge 6 is formed on the lower edge of the body 1 adjacent the top of the arm 3.

A plurality of flexible prongs 7 are suitably secured to the inner surface of the body 1. The prongs 7 are preferably laminated or formed of a plurality of spring leaves and their bases are held flush with the inner surface within pockets 8. It will be noted that if the tool to be recovered is small only the upper or longest of the leaves of prongs 7 would engage the same. If however the object were slightly larger, the longest of the leaves would be flexed outwardly a sufficient distance for the leaf immediately below the longest leaf to engage the same so that the tool would be engaged by two leaves acting on different portions of the length of the tool. If however the tool were large and heavy, it would bend outwardly the two upper leaves of the flexible prong 7 so that all three of the leaves of each prong would engage the tool and each of the leaves would act upon the tool at different portions of its length. I have therefore provided means whereby either a small or large tool may be engaged and brought to the surface and I have provided means whereby a large and heavy tool will be much more securely held than a light tool. Pressure escape holes 9 are formed in the upper end of the body 1.

My tool is suitably secured to a fishing string which consists of jars, stem, socket, and cable.

The method of operation of my tool is as follows:

The fishing tool is lowered into the hole until it comes to rest upon the loose material in the bottom of the hole or upon the articles being fished for. The tool is then driven downward through the loose material in the bottom of the hole, the accumulation of pressure inside of the tool being prevented by the pressure escape holes 9. The loose material and lost article being fished for enter the tool, bending back the flexible prongs and entering the body of the tool 1. If the article being fished for is elongate, it is probable that the arm 3 will rest upon the article at some distance from its center. Under such circumstances when the tool is driven downward in the soft material in the bottom of the hole the tool will up-end the article so that it can enter the body of the fishing tool lengthwise which it might not be able to do cross-wise. The corrugations 5 also assist in engaging the elongated tool and placing it in a position that it may enter the main body 1.

Having described my invention, I claim:

1. A fishing tool comprising a cylindrical body and a plurality of laminated prongs imbedded in pockets in said body.

2. A fishing tool comprising a body, and a plurality of yieldable laminated prongs imbedded in pockets in said body.

3. A fishing tool comprising a cylindrical body adapted to be secured to a fishing string, a plurality of laminated prongs in said body, and an arm depending from said body.

4. A fishing tool comprising a cylindrical body adapted to be secured to a fishing string, a plurality of laminated prongs in said body, and an arm depending from said body, said arm being semi-circular in cross section, and a cutting edge on the bottom of said arm.

5. A fishing tool comprising a cylindrical body adapted to be secured to a fishing string, a plurality of laminated prongs in said body, and an arm depending from said body, said arm being semi-circular in cross section, a cutting edge on the bottom of said arm, and a cutting edge on the bottom of said body adjacent the top of said arm.

6. A fishing tool comprising a cylindrical body adapted to be secured to a fishing string, a plurality of laminated prongs in said body, an arm depending from said body, said arm being semi-circular in cross section, a cutting edge on the bottom of said arm, and a plurality of corrugations in said arm above said cutting edge.

7. A fishing tool comprising a body and a plurality of flexible prongs within the body, each of said prongs comprising a plurality of laminated leaves, the longer of said leaves forming the upper portion of said prongs and the shorter of said leaves forming the lowermost portion of said prongs.

8. A fishing tool comprising a body and a plurality of yieldable prongs within said body, each of said prongs consisting of a plurality of leaves of different lengths, the leaves decreasing in length from top to bottom.

In testimony whereof I affix my signature.

WILLIAM IRA McLAUGHLIN.